US006543143B2

(12) United States Patent
Moore et al.

(10) Patent No.: US 6,543,143 B2
(45) Date of Patent: Apr. 8, 2003

(54) METAL CUTTING CIRCULAR SAW WITH INTEGRAL SIGHT WINDOW

(75) Inventors: Keith Moore, Owings Mills, MD (US); Weston J. Van Wambeke, Baltimore, MD (US); Joel D. Sayles, Parkville, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/827,817

(22) Filed: Apr. 6, 2001

(65) Prior Publication Data

US 2002/0144405 A1 Oct. 10, 2002

(51) Int. Cl.$^7$ ............................................... B23D 47/00
(52) U.S. Cl. .............................. 30/391; 30/390; 83/478
(58) Field of Search ......................... 30/123, 390, 391; 83/478, 520

(56) References Cited

U.S. PATENT DOCUMENTS

| | | |
|---|---|---|
| 1,312,651 A | 8/1919 | Walters |
| 1,830,579 A | 11/1931 | Wappat |
| 4,450,627 A | 5/1984 | Morimoto ..................... 30/391 |
| 4,539,881 A | 9/1985 | Maier ............................. 30/374 |
| 4,982,501 A | 1/1991 | Sauerwein et al. ............ 30/376 |
| D335,433 S | 5/1993 | Schultz et al. ................. D8/66 |
| D363,656 S | 10/1995 | Gierke ........................... D8/66 |
| 5,737,843 A | 4/1998 | Finger et al. .................. 30/391 |
| 5,794,351 A | 8/1998 | Campbell et al. ............. 30/390 |
| 5,822,864 A | 10/1998 | Campbell et al. ............. 30/123 |
| D411,425 S | 6/1999 | Sugimoto et al. ............. D8/66 |
| 5,911,482 A | 6/1999 | Campbell et al. ............. 30/390 |
| D418,032 S | 12/1999 | Watson et al. ................. D8/66 |
| D421,702 S | 3/2000 | Sakai et al. .................... D8/66 |
| 6,055,734 A | 5/2000 | McCurry et al. .............. 30/391 |
| D427,874 S | 7/2000 | Hayakawa et al. ............ D8/66 |
| D428,318 S | 7/2000 | Gallagher et al. ............. D8/66 |
| D428,319 S | 7/2000 | Gallagher ...................... D8/66 |
| D429,133 S | 8/2000 | Lui ................................ D8/66 |
| 6,094,827 A | 8/2000 | Campbell ...................... 30/390 |
| 6,108,916 A | 8/2000 | Zeiler et al. ................... 30/391 |
| 6,161,293 A | 12/2000 | Watson ......................... 30/377 |
| 6,237,230 B1 * | 5/2001 | Campbell et al. ............. 30/390 |
| 6,269,543 B1 | 8/2001 | Ohkouchi |
| 6,276,064 B1 * | 8/2001 | Campbell ...................... 30/390 |
| 6,308,424 B1 * | 10/2001 | Stielper ......................... 30/391 |

FOREIGN PATENT DOCUMENTS

| | | |
|---|---|---|
| CH | 358579 | 11/1961 |
| DE | 3104340 C2 | 2/1982 |
| DE | 3345335 A1 | 12/1983 |
| DE | 3540625 C2 | 6/1986 |
| DE | 19602440 A1 | 1/1996 |
| DE | 29903876 U1 | 7/1999 |
| DE | 29917188 U1 | 12/1999 |
| DE | 29905486 U1 | 8/2000 |
| JP | 8-207014 | 8/1996 |

* cited by examiner

*Primary Examiner*—Hwei-Siu Payer
(74) *Attorney, Agent, or Firm*—Harness, Dickey & Pierce, P.L.C.

(57) ABSTRACT

A metal cutting circular saw is provided with an upper blade guard which includes a first sight window disposed in a first side surface and disposed in a plane angularly offset from a plane of the blade. The upper blade guard also includes a second sight window disposed in the second side surface of the upper blade guard. A light window is disposed in a front portion of the perimeter outer surface of the upper blade guard. The upper blade guard is made from metal and the first and second sight windows and the light window are integrally formed as a one-piece member. The saw shoe and lower blade guard are configured to minimize chip spray from contacting a user.

14 Claims, 14 Drawing Sheets

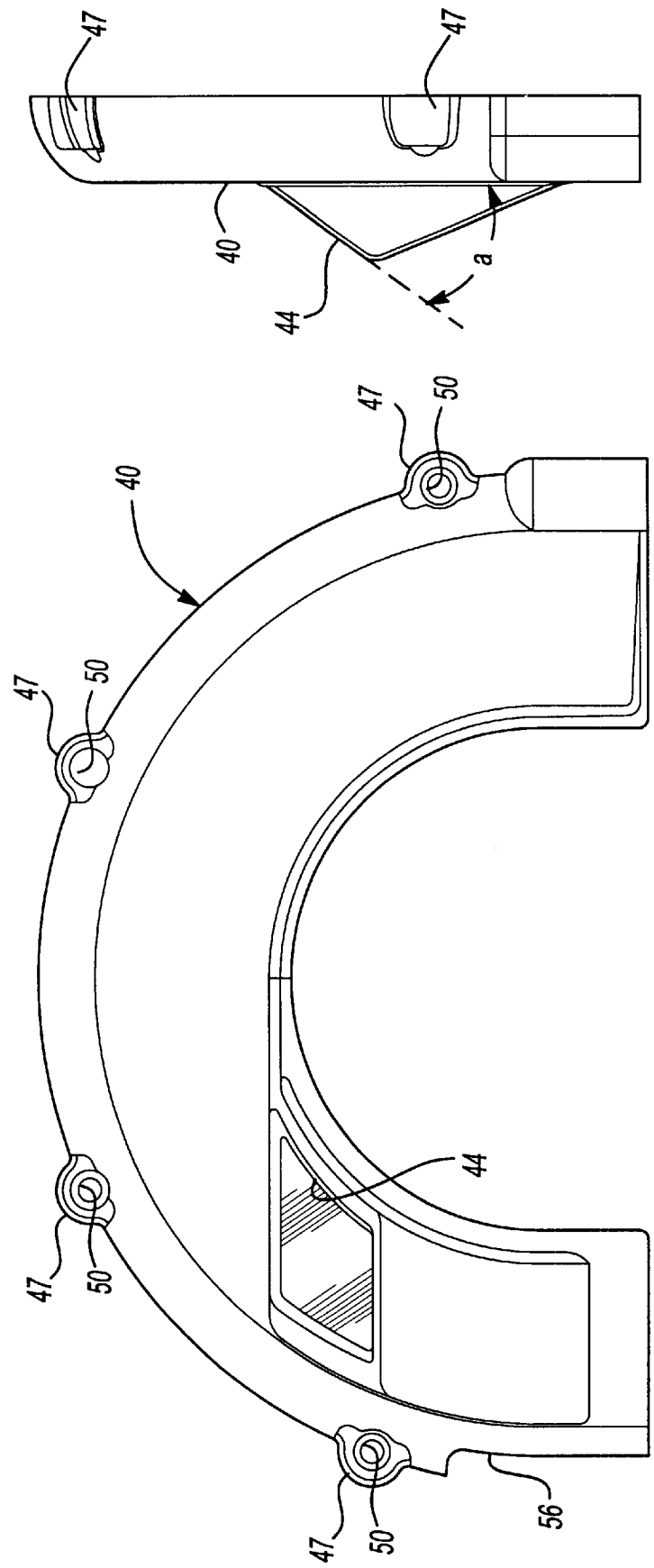

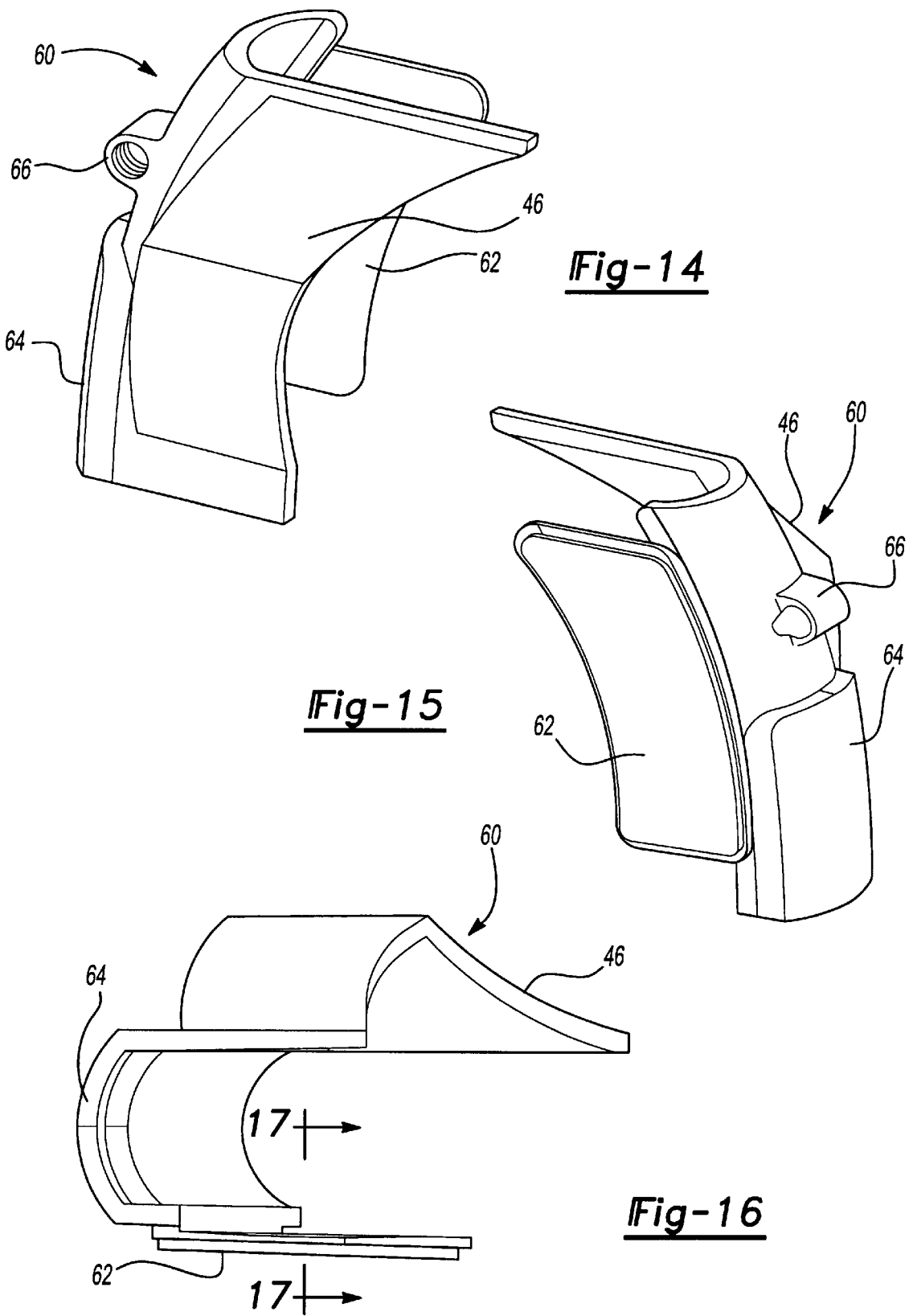

METAL CUTTING CIRCULAR SAW WITH INTEGRAL SIGHT WINDOW

FIELD OF THE INVENTION

The present invention relates to a circular saw and more particularly to a metal cutting circular saw having a viewing window on the upper guard, which is specifically designed to protect the user from metal chips.

BACKGROUND AND SUMMARY OF THE INVENTION

One of the problems associated with the use of a handheld circular saw is properly aligning the saw so that the desired cut is achieved. Typically, a user will draw a line on the material to be cut. This line represents the location of the desired cut. The problem arises when the user of the handheld circular saw attempts to align the blade with the line on the material. The problem continues as the user attempts to keep the blade tracking on the desired cut line.

To assist in the alignment, circular saws are typically provided with a guide slot. The guide slot is usually located on the planar cutting base or shoe of the saw, and is positioned in front of, and in line with, the circular saw blade. The user positions the saw so that the line on the material appears in the guide slot. While the provision of such a guide slot does aid the user in proper saw alignment, problems still exist. Because the blade is covered by a saw guard, the user cannot see the blade as it exits the material and therefore cannot directly monitor the travel of the blade. Attempts have been made to allow the user of the saw to view the blade as it exits the material, thereby allowing the user to properly guide the blade along the desired cut line. Viewing windows have been provided to allow the user of the saw to properly align the saw to the work piece by allowing them to view the blade. While this viewing window solves the problems to some degree, its positioning remains a problem.

If the viewing window is not properly positioned, the user will be unable to see the blade exiting the material due to the reflection of light by the transparent section of the viewing window. To compensate, the user may attempt to reposition the light sources, such as a flashlight, or may reposition himself/herself relative to the saw. This repositioning can affect efficiency as well the quality of the work being performed. If the user repositions himself/herself relative to the saw, the resulting position may be an uncomfortable or unsafe one from which to operate the saw. Further, the trial and error necessary to find a proper position of saw, user and light source waste the user's time.

The position of the viewing window and the saw guard must also account for the chips that are generated as the saw cuts through the work piece. This problem is particularly relevant when the circular saw is used for cutting metal. Thus, there is also a need in the art for metal cutting circular saws to be equipped to protect the user from chips and debris while cutting metal materials. Accordingly, it is an object of the present invention to provide a window assembly in the upper guard of a circular saw in a position so as to minimize any light reflected into the eyes of the person using the saw.

It is another object of the present invention to provide a guard design which controls and minimizes the ejection of chips along with a saw shoe, and lower guard design which is optimized for the same purpose. It is a further object of the present invention to provide an upper guard that is made of strong material, yet provides plenty of light to be passed therethrough to illuminate the cutting line and blade interface area.

These and other objects of the present invention are obtained by providing a circular saw including a motor and blade drivingly attached to the motor. An upper blade guard is provided in partial covering relationship over the blade and includes a perimeter outer surface disposed between first and second side surfaces. The upper blade guard includes a first sight window disposed in the first side surface and disposed in a plane angularly offset from a plane of the blade. The upper blade guard also includes a second sight window disposed in the second side surface of the upper blade guard. A light window is disposed in the front portion of the perimeter outer surface of the upper blade guard. The upper blade guard is made from metal and the first and second sight windows and light window are integrally formed as a one-piece member. The upper blade guard includes a first portion attached to the motor housing and a second portion attached to the first portion. The sight window unit is disposed between the first and second portions of the upper blade guard and is secured therein by a fastener.

BRIEF DESCRIPTION OF THE DRAWINGS

The present invention will become more fully understood from the detailed description and the accompanying drawings, wherein:

FIG. 7 is a side elevation view of the cover portion of the upper guard assembly according to the principles of the present invention;

FIG. 8 is a rear plan view of the cover portion of the upper guard assembly;

FIG. 14 is a left perspective view of the sight window unit according to the principles of the present invention;

FIG. 15 is a right perspective view of the sight window unit shown in FIG. 14;

FIG. 16 is a bottom view of the sight window unit shown in FIG. 14;

DETAILED DESCRIPTION OF THE PREFERRED EMBODIMENTS

The following description of the preferred embodiment is merely exemplary in nature and is in no way intended to limit the invention, its application, or uses.

Figure 1:
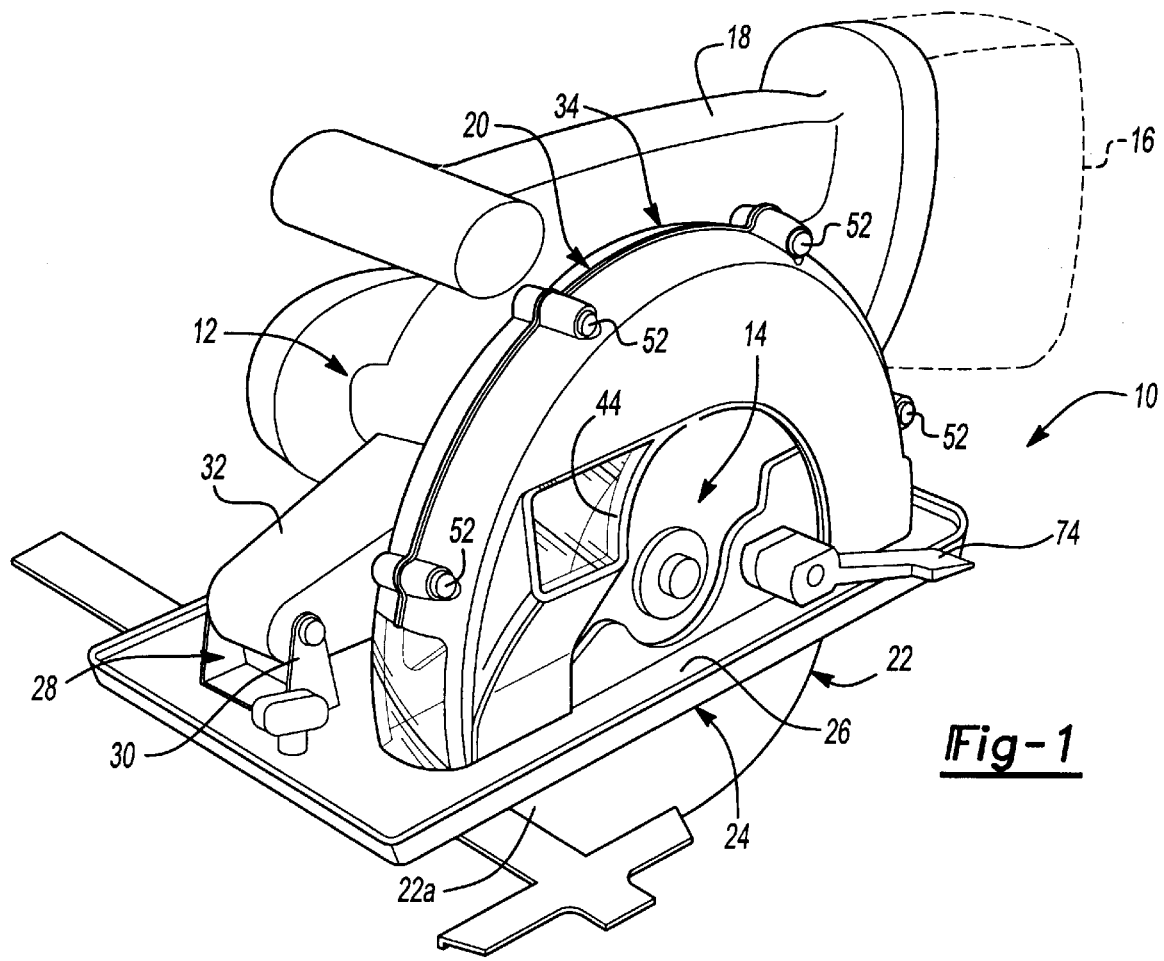
FIG. 1 is a front perspective view showing a metal cutting circular saw having an upper guard with an integral sight window according to the principles of the present invention.

Referring to the drawings in greater detail, and initially to FIG. 1, a metal cutting power circular saw designated generally by numeral "10" is shown. Saw 10 has a motor 12 which is operably attached to a circular saw blade 14. A battery pack 16 is mounted to a handle portion 18. The battery pack 16 supplies electrical power to motor 12. The upper portion of blade 14 is surrounded by an upper blade guard assembly 20. Upper blade guard assembly 20 is fixedly secured to motor 12. A lower portion of blade 14 is surrounded by a lower saw guard 22. Saw 10 further has a saw shoe 24 defining a planar base with an elongated slot 26 for receiving the circular saw blade 14 therethrough.

Lower guard 22 exposes the lower portion of blade 14 in a manner that is well known in the art. More specifically, the front edge 22a of lower guard 22 engages the leading edge of a work piece (not shown). As the saw passes further into the work piece, the lower guard 22 is rotated generally rearwardly and upwardly to expose the lower portion of the blade 14. Lower guard 22 is spring loaded so that when saw 10 is disengaged from the work piece, the lower guard 22 returns to its forward, lower blade covering position.

Figure 24:
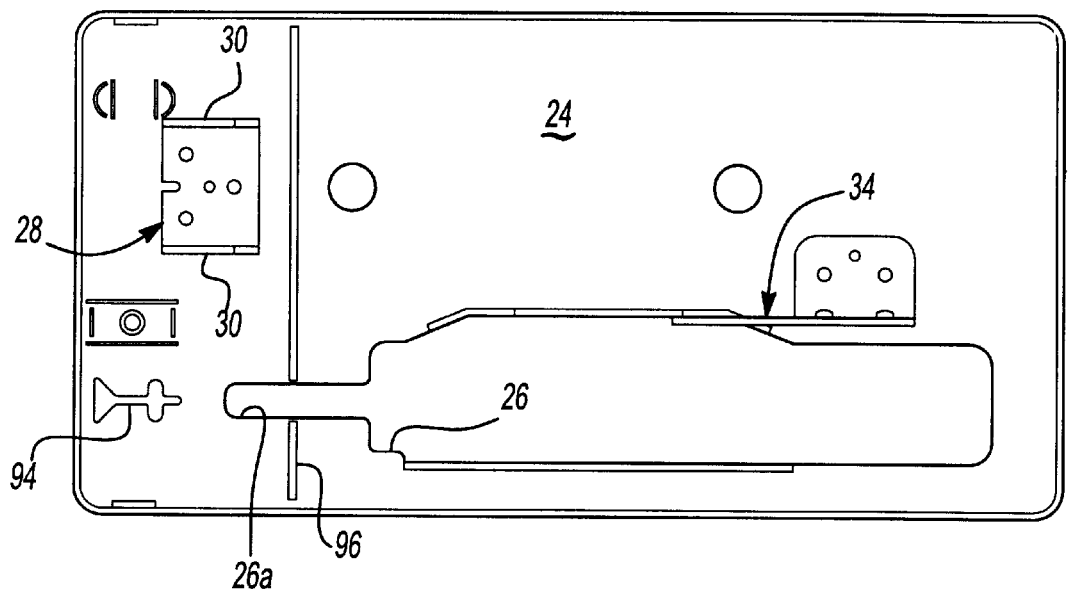
FIG. 24 is a top plan view of the saw shoe with the pivot bracket and pivot slot bracket mounted thereon.
Figure 25:
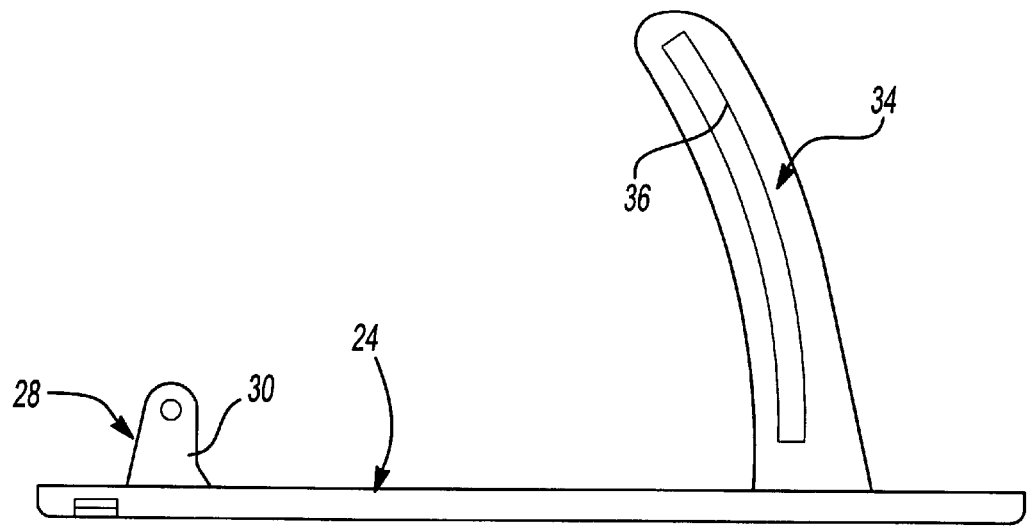
FIG. 25 is a side view of the saw shoe and brackets shown in FIG. 24.

The saw shoe 24 is pivotally mounted to the motor 12 by a forward pivot bracket 28 which is mounted to the saw shoe 24 and includes upwardly extending ears 30 which receive an extension 32 of the motor housing therebetween for pivotally mounting the saw shoe 24 to the motor 12. As shown in FIGS. 24 and 25, an arcuate bracket 34 is mounted to a rear portion of the saw shoe 24. The arcuate bracket 34 includes an arcuate slot 36 which is adjustably engaged with the motor 12 to vary the angular orientation of the saw shoe 24 with respect to the motor 12 in a manner that is well known in the art.

Figure 2:
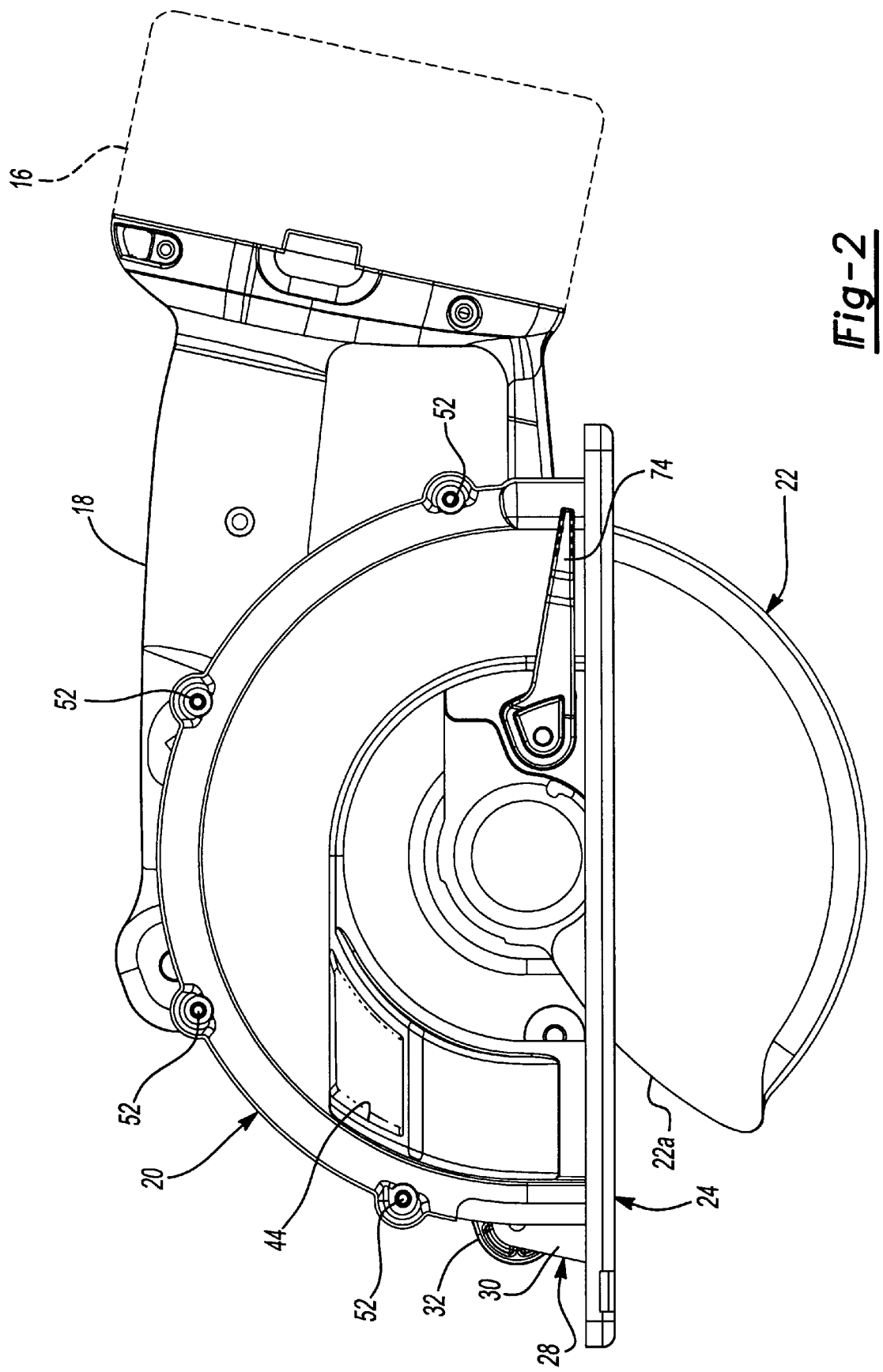
FIG. 2 is a side elevation view of the saw of FIG. 1.
Figure 3:
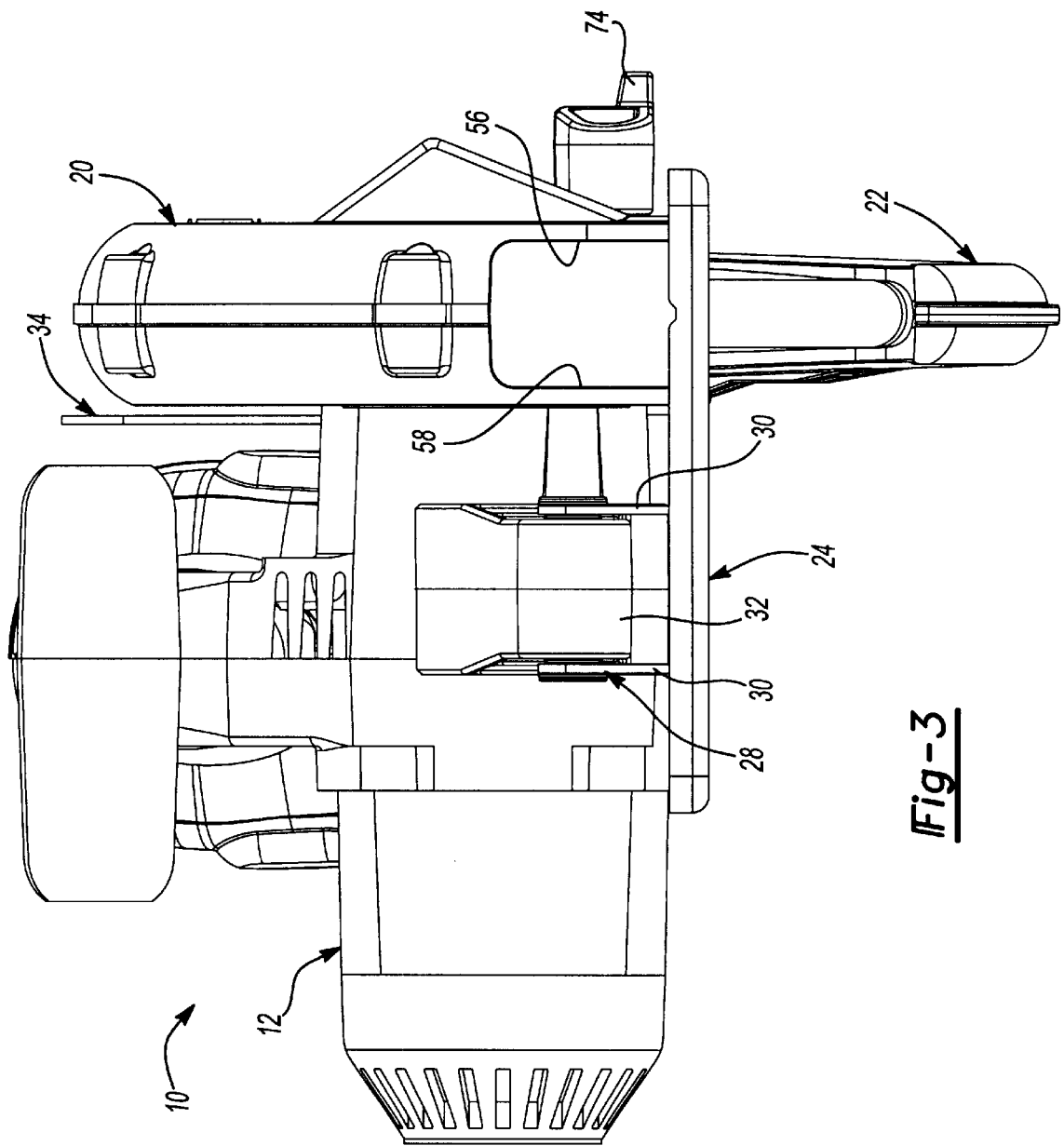
FIG. 3 is a front elevation of the saw of FIG. 1 and illustrating the front light window in the upper guard.
Figure 6:
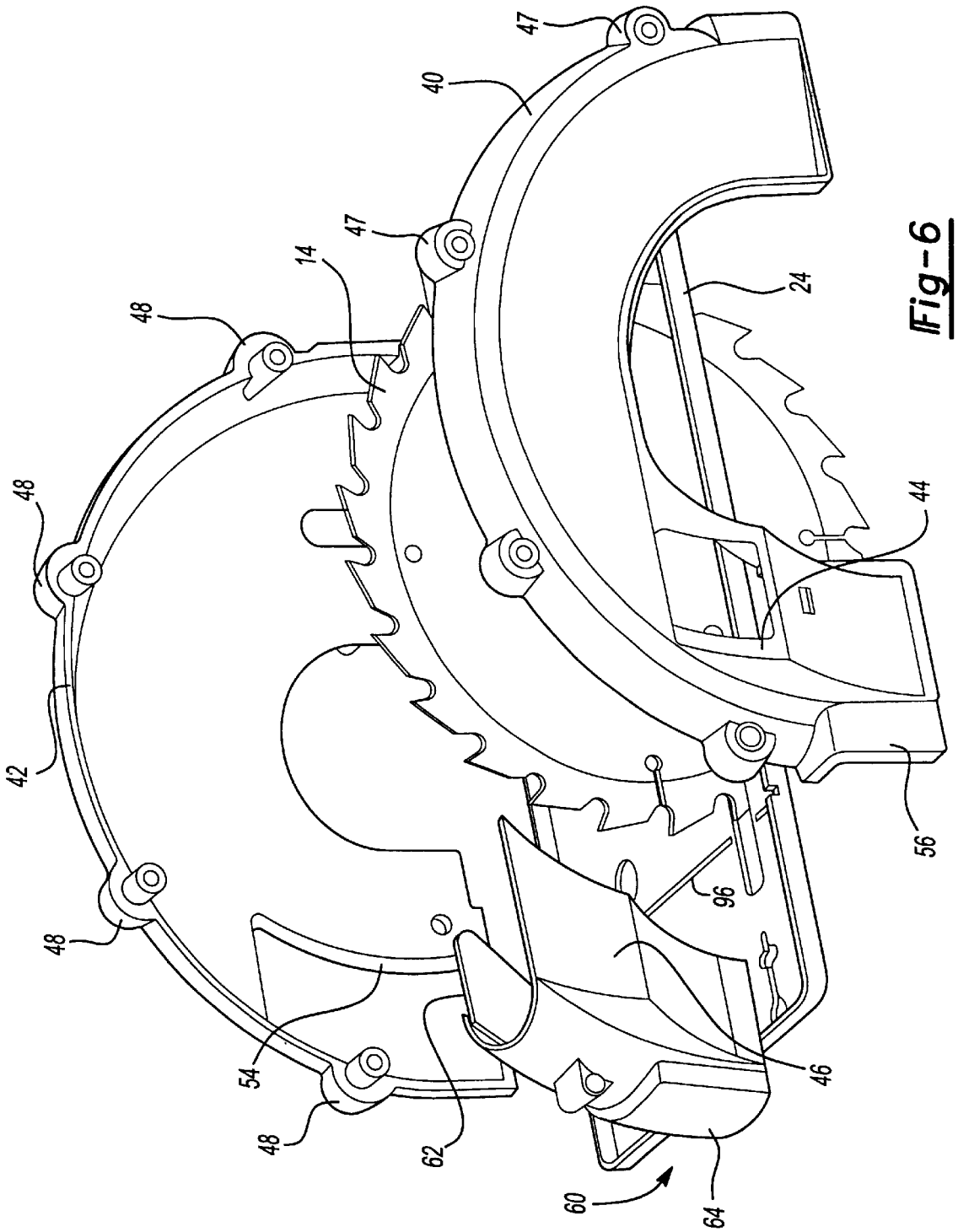
FIG. 6 is an exploded perspective view of the upper guard, sight window, saw blade, and shoe according to the principles of the present invention.
Figure 10:
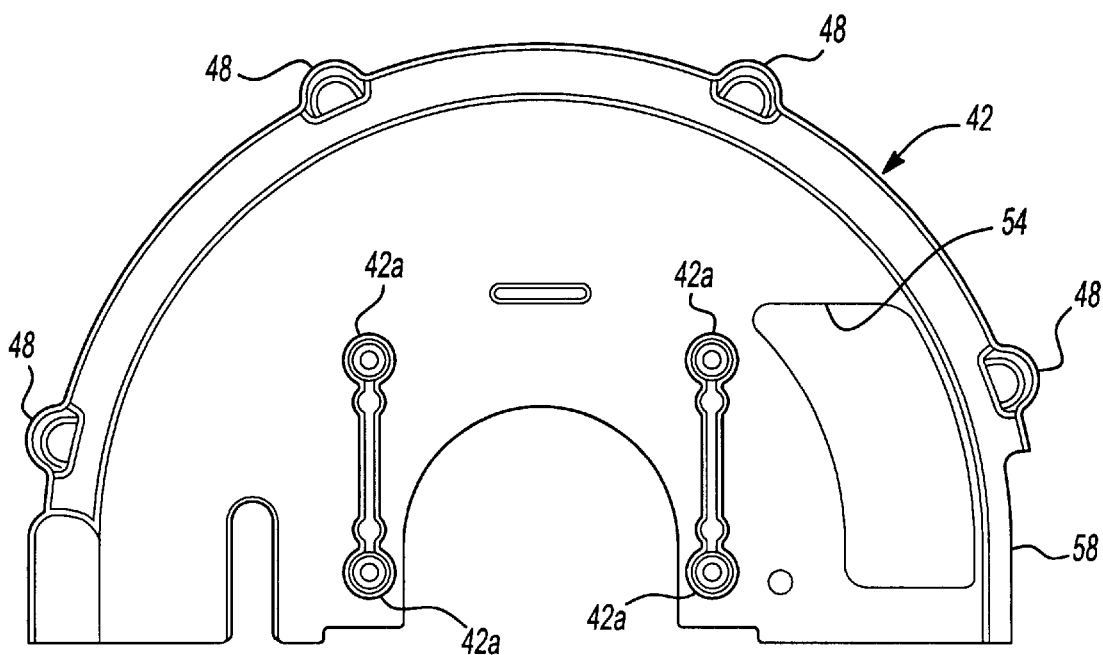
FIG. 10 is a side elevation view of the main assembly portion of the upper guard assembly according to the principles of the present invention.
Figure 12:
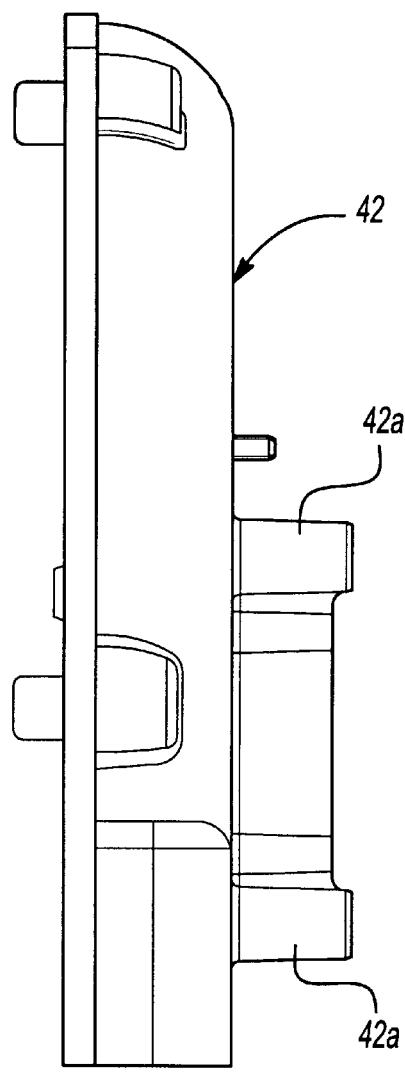
FIG. 12 is a rear elevation view of the main assembly portion of the upper guard assembly.
Figure 13:
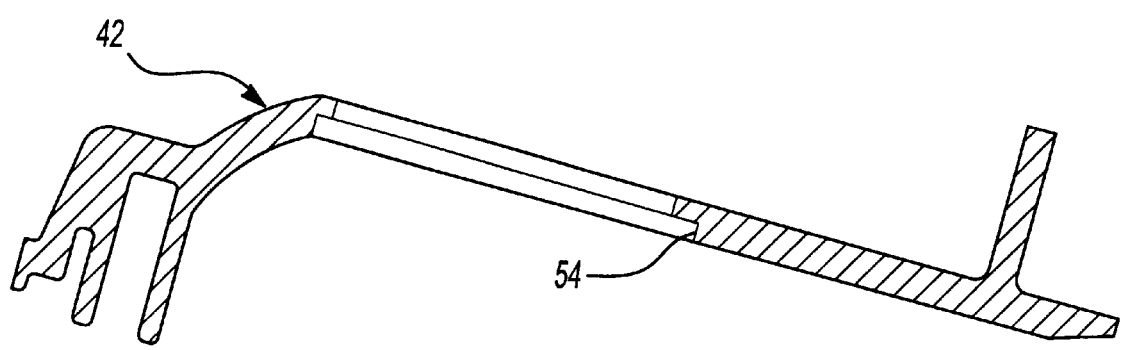
FIG. 13 is a cross-sectional view taken along line 13—13 of FIG. 11.
Figure 17:
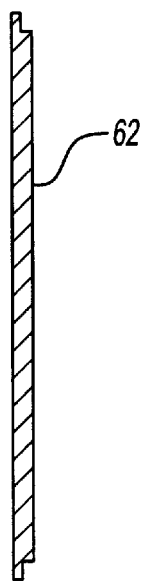
FIG. 17 is a cross-sectional view taken along line 17—17 of FIG. 16.
Figure 18:
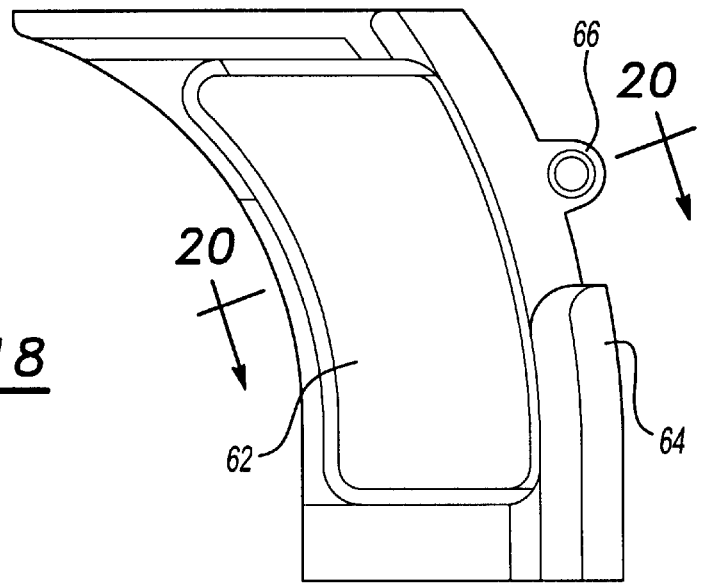
FIG. 18 is a right side view of the sight window unit shown in FIG. 14.
Figure 19:
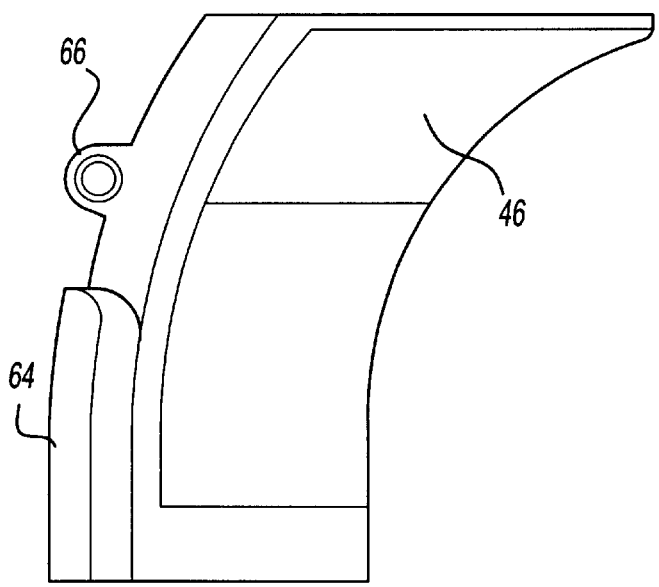
FIG. 19 is a left side view of a sight window unit shown in FIG. 14.
Figure 20:
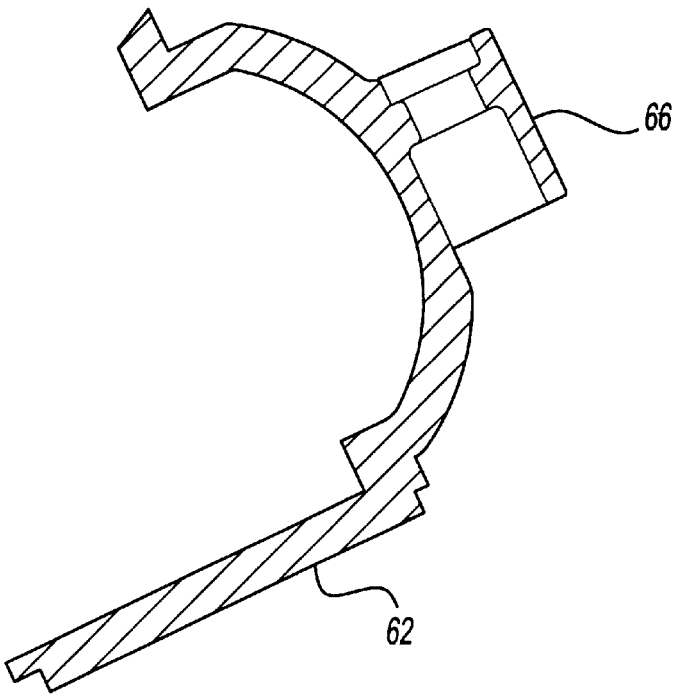
FIG. 20 is a cross-sectional view taken along line 20—20 of FIG. 18.
Figure 21:
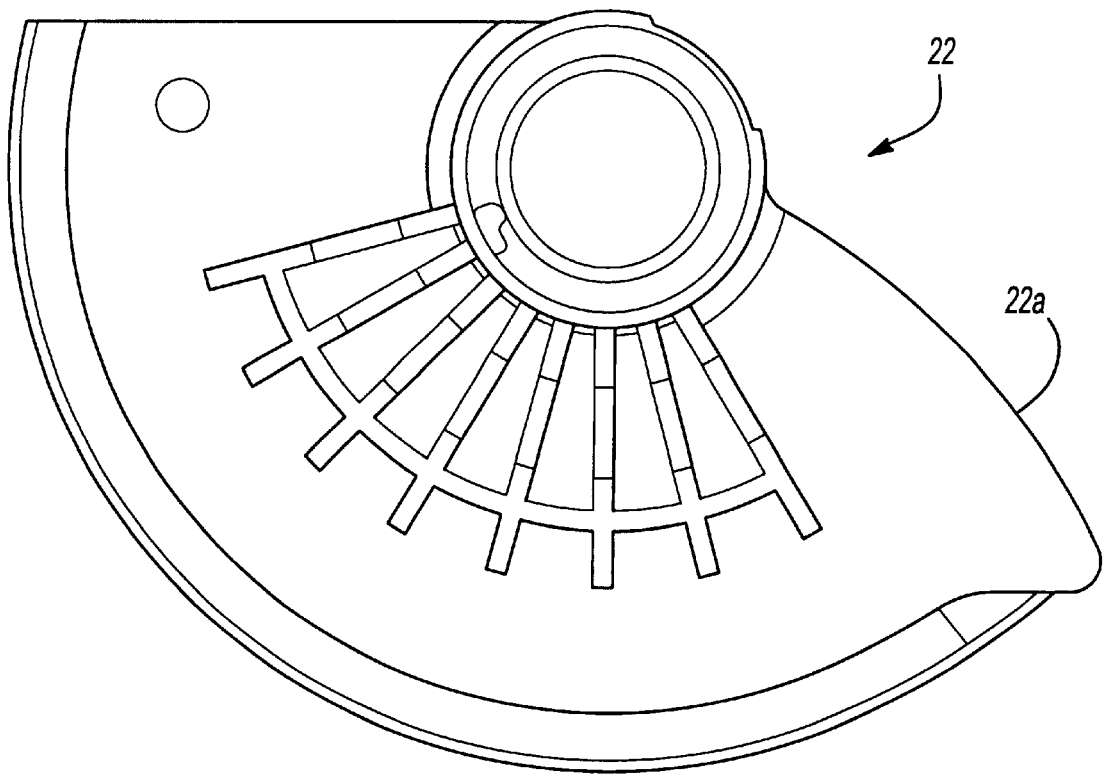
FIG. 21 is a side elevation view of the inner surface of the lower guard.
Figure 22:
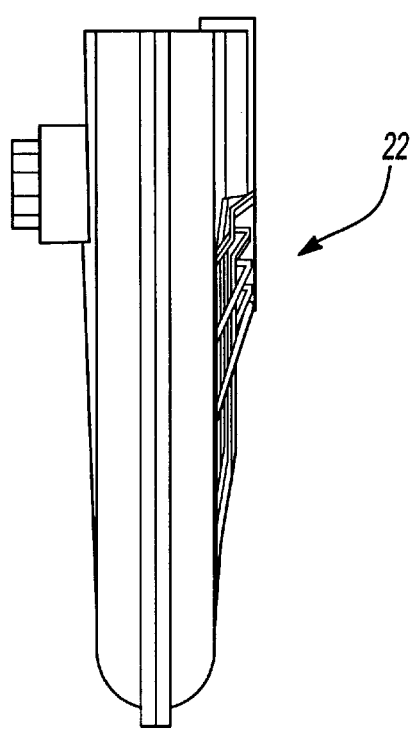
FIG. 22 is a rear elevation view of the lower guard.

As best shown in FIG. 6, the upper blade guard assembly 20 includes a cover half portion 40 disposed on an outboard side of the blade 14 and an assembly half portion 42 disposed on an inboard side of the blade 14. The cover half portion 40 and assembly half portion 42 are each ma de of die-cast aluminum. The assembly half portion 42 includes mounting bosses 42a (best shown in FIGS. 10 and 12) which are used to mount the upper blade guard assembly 20 to the motor 12. The cover half portion 40 of the upper guard assembly has a unique angled exterior window frame portion 44 in which a sight window 46 is placed to provide an optimized viewing aperture for the user while using the saw 10. The cover half portion 40 includes a plurality of mounting bosses 47 which align with corresponding mounting bosses 48 provided on the assembly half portion 42 for mounting the cover half portion 40 to the assembly half portion 42 of the upper guard assembly 20. Each of the mounting bosses 47 include an aperture 50 (FIG. 7) extending therethrough for receiving a fastener 52 (best shown in FIGS. 1 and 2) therethrough. The fasteners 52 are threadedly received within bosses 48 of the assembly half portion 42 of the upper blade guard assembly 20.

Figure 4:
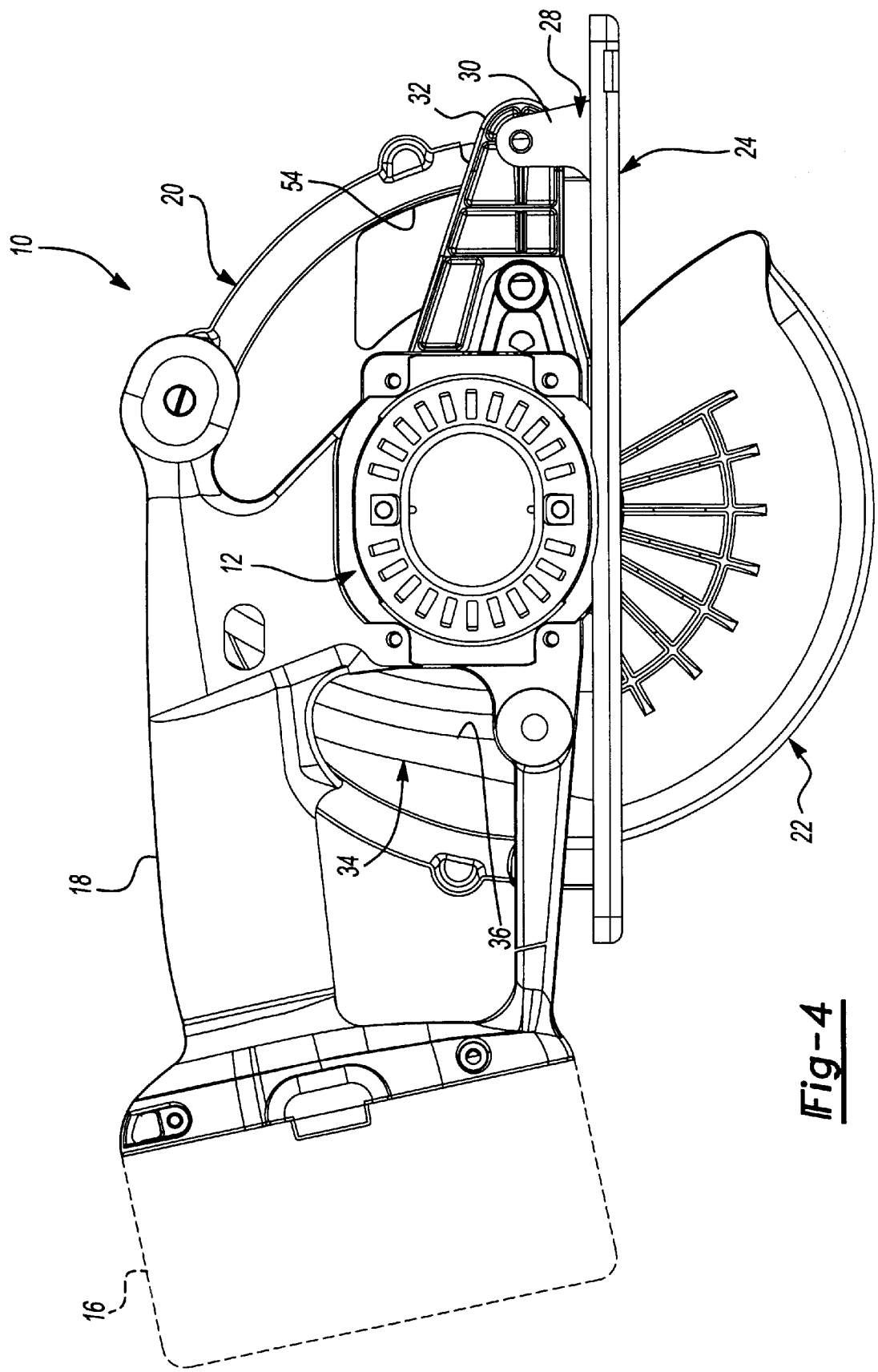
FIG. 4 is a right side elevation view of the saw of FIG. 1 and partially illustrating the right side sight window according to the principles of the present invention.
Figure 5:
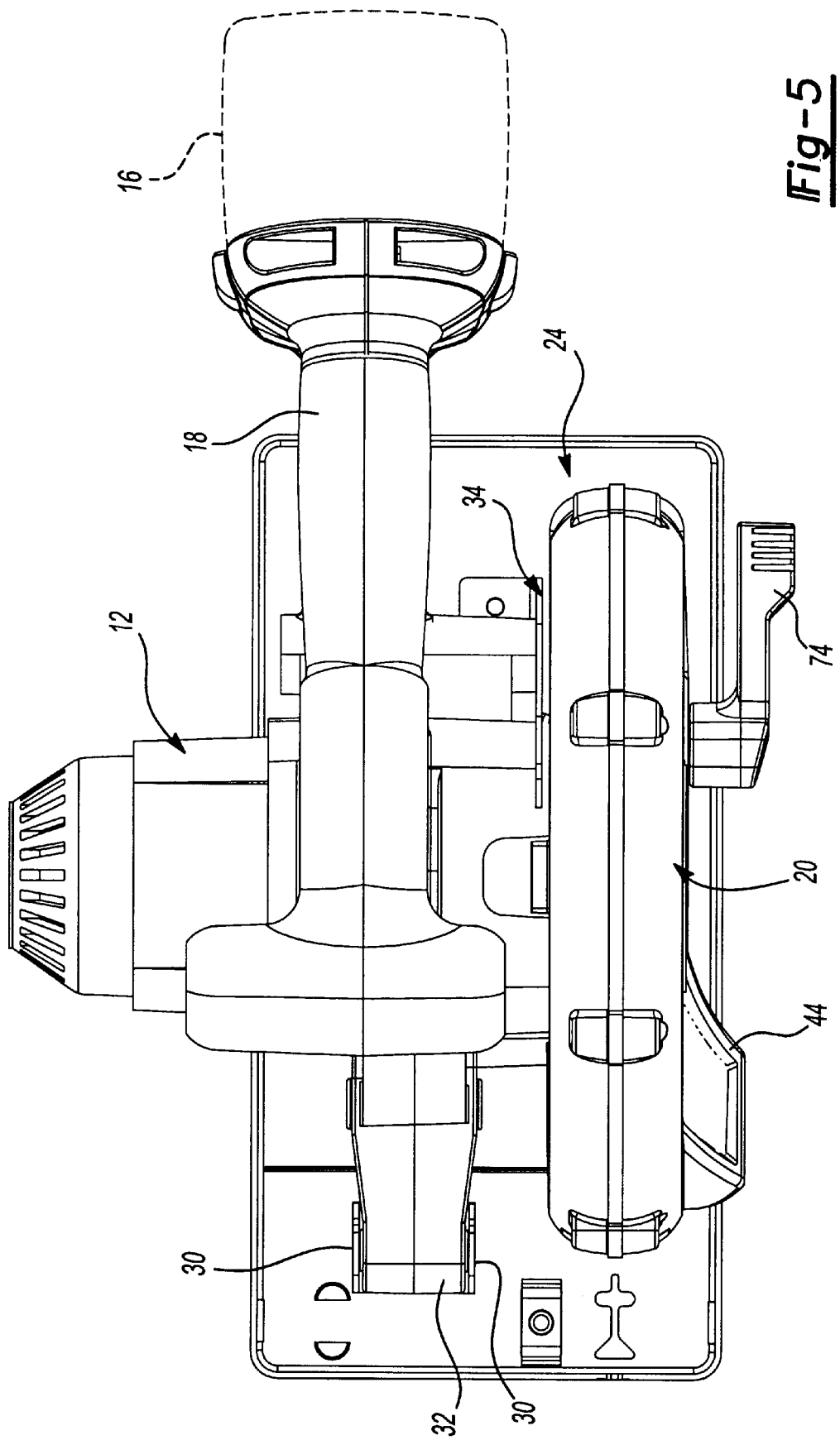
FIG. 5 is a top view of the saw of FIG. 1.

As seen in FIG. 4, the assembly half portion 42 includes a second window frame 54 disposed in the side surface of the assembly half portion 42. The cover half portion 40 and assembly half portion 42 each are provided with a window frame recessed portion 56 and 58, respectively, in the outer periphery surface thereof for, in combination, defining a third window frame.

As seen in FIG. 6, a sight window unit 60 is provided including first sight window portion 46, a second sight window portion 62, and a front light window portion 64 integrally formed as a unitary piece. As best shown in FIGS. 14–20, the sight window unit 60 is formed as a unitary member and includes a mounting boss portion 66 which is received by the front boss portions 47, 48 of the cover half portion and assembly half portion 40, 42 of the upper blade guard assembly 20. The mounting boss 66 maintains the proper orientation of the sight glass unit 60 within the upper guard assembly 20. The molded screw boss 66 is trapped around the mounting bosses 47, 48 of the cover half portion and assembly half portion 40, 42 of the blade guard assembly 20.

Figure 9:
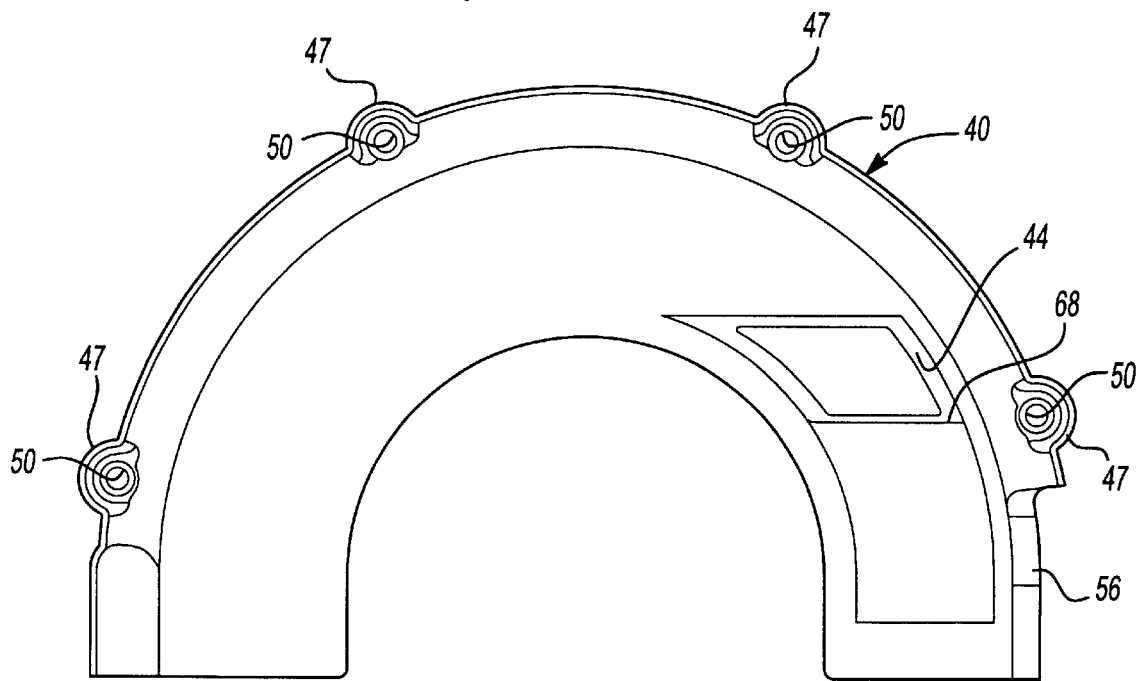
FIG. 9 is a side elevation view of the inner side of the cover portion of the upper guard assembly.
Figure 11:
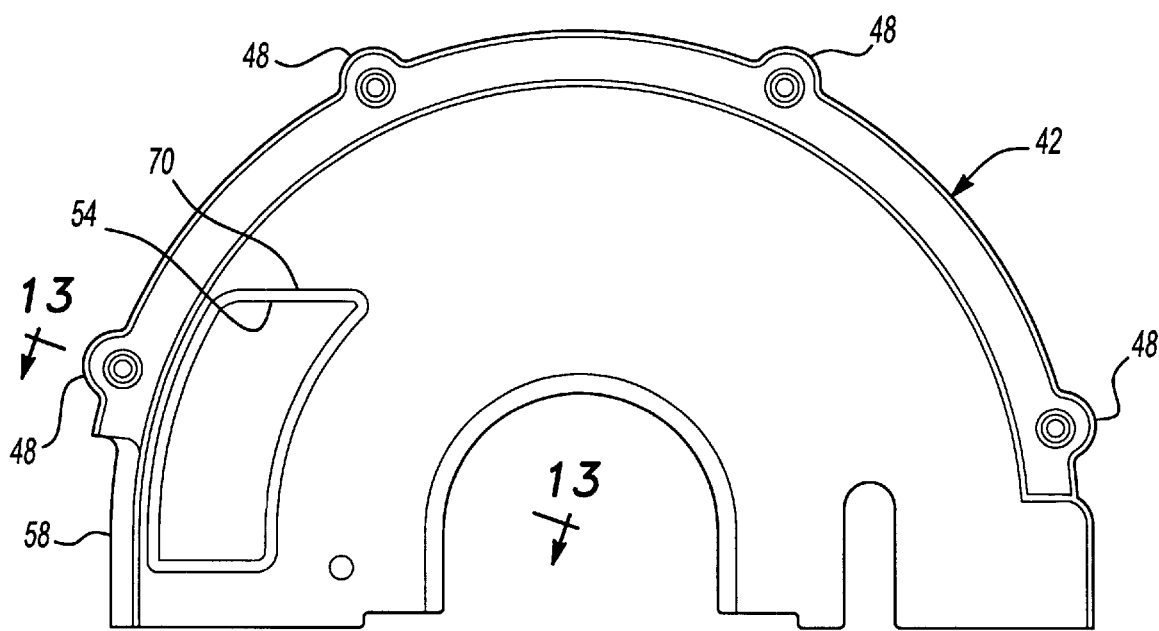
FIG. 11 is a side elevation view of the inner side of the main assembly portion of the upper guard assembly.

The upper guard halves 40, 42 are configured with the necessary recesses 68, 70 (see FIGS. 9 and 11, respectively) to receive the sight window unit 60. The angled orientation of the first sight window 46 is designed to provide the optimum viewing aperture while using the saw. Although this angle may vary with regard to different saw applications, the sight window 46 is disposed at an angle "a" (See FIG. 8) of between 20 and 60 degrees relative to the side surface of the cover half portion 40 of the upper blade guard assembly 20. According to a preferred embodiment of the present invention, the first sight window 46 is disposed between approximately 35 to 40 degrees relative to the side surface of the cover half portion 40 of the upper blade guard 20. The window frame portion 44 projects outwardly from the side surface of the cover half portion 40 of the upper blade guard assembly 20.

The second sight window 62 is provided in the right side of the blade guard assembly 20 and is substantially flush with the surface of the blade guard. The light window 64 which is provided along the front edge in the lower front periphery surface of the blade guard 20 permits light to enter into otherwise dark areas of the guard enclosure. The sight window unit 60 functions as an integral part of the guard system and thereby protects the end user from chip spray. The design of the sight window unit 60 and the position of the windows 46, 62, and 64 allows for cutting line of sight to be visual from both sides of the upper guard assembly 20.

The sight window unit 60 is a clear plastic material that is hard shell dip-coated in a silicone-based material to extend the clarity of the sight window for long periods of product use. The design is enhanced to provide maximum visibility of the cut line while virtually eliminating the glare or reflective characteristics associated with sight windows. The design accomplishes this by the angular positioning of the sight window 46 as well as the extended projecting window frame portion 44 which allows a clear view of the attack point of the blade. The three-part window design allows for adequate light penetration to the front, left, and right interior surfaces of the upper guard 20.

Figure 23:
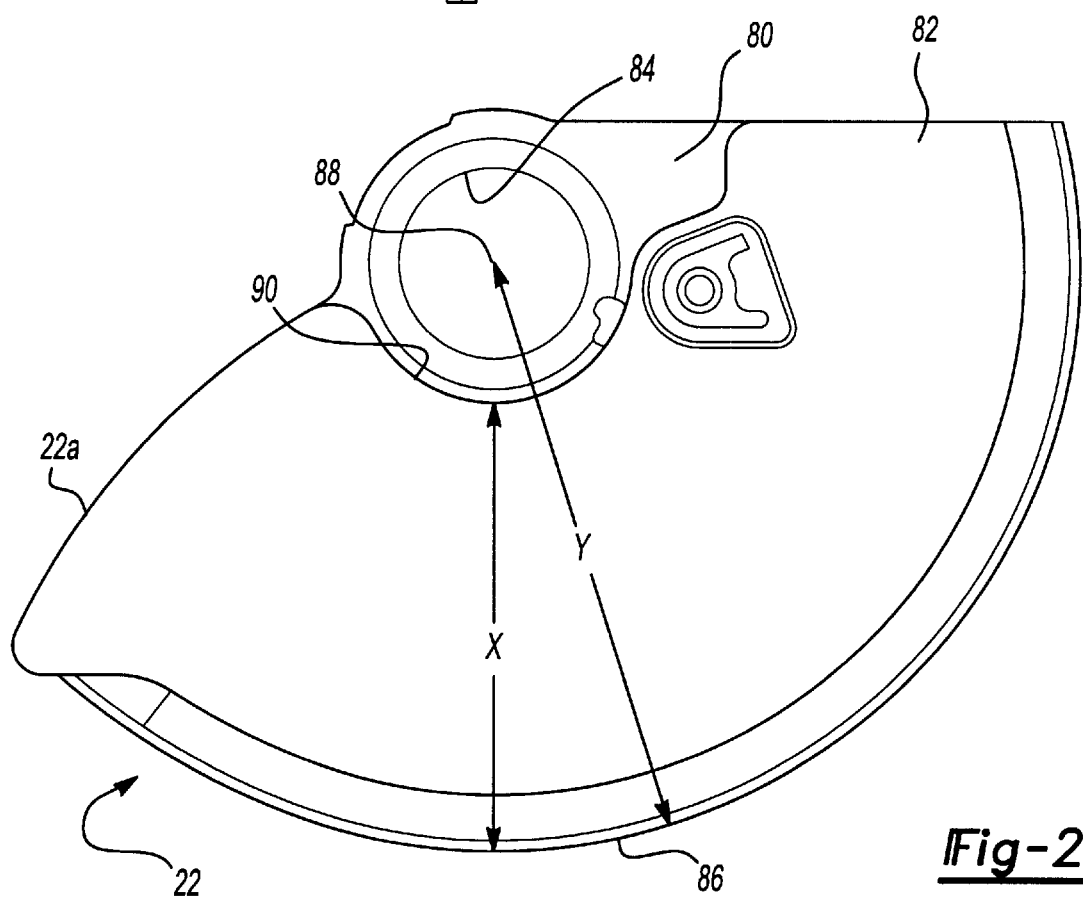
FIG. 23 is a side elevation view of the outer surface of the lower guard.

The lower guard 22 is designed with closed in areas around the sides of the blade to minimize the openings for metal chips to escape, and impact an end user. The lower guard 22 is preferably made from die-cast aluminum. The lower guard 22 provides a safe guard function and allows for easy access for blade replacement and removal. The lower guard 22 is provided with a lift lever 74, as shown in FIG. 1 which is configured to operate smoothly around the angled exterior sight window feature 44, 46 of the upper guard assembly 20. The lower guard 22 includes an inboard wall portion 80 and an outboard wall portion 82, as best illustrated in FIG. 23. The inboard wall portion 80 includes an aperture 84 which is rotatably mounted about a hub for pivotal movement thereabout. The outboard wall portion 82 of the lower guard 22 extends approximately 75 percent of the distance from the outer peripheral edge 86 of the lower guard 22 to the pivot axis 88 of the lower guard 22. In other words, as illustrated in FIG. 23, the distance X between the outer periphery 86 and the inner end 90 of the outboard wall portion 82 is greater than approximately 60 percent of the distance Y from the outer periphery surface 86 to the center of rotation 88 of the lower guard 22, and preferably approximately 75 percent. This provides a lower guard that covers a much larger portion of the blade 14 than prior designs. In particular, the lower guard 22 of the present invention covers approximately 40 percent more of the saw blade 14 than standard guards on wood cutting circular saws. In a preferred embodiment, the distance X of the present invention is approximately 62 millimeters versus standard guards which have a distance of approximately 40 millimeters. The increased blade coverage of the present invention provides a significant enclosure of the blade 14 to prevent metal chips from escaping and impacting a user.

The saw shoe 24 is provided with a saw blade opening 26 that has a narrow opening portion 26a at the attack point of the blade while providing the proper field of vision of the cut line while the end user sights through the sight window apertures. The narrow portion 26a of the saw blade opening 26 is uniquely configured to minimize chip spray and prevent small cut off stock from entering the upper guard by minimizing the hazard of the guard ingesting materials that could damage the carbide blade. Likewise, this feature controls the chip spray away from impact points of the sight window thereby adding to the life performance of the sight windows. The shoe 24 is made of stainless steel to prevent the accumulation of metal chip build and provide a highly durable work surface. The kerf indicator 94 is designed to allow the user to easily align the work piece to the blade cutting location. The kerf indicator 94 has a geometry which allows direct alignment in tough-to-see locations, such as when it is dark. The shoe is equipped with a line indicator 96 marking the position of the blade. The combination of the kerf indicator 94 and blade marking line 96 provide a "gun sight" approach allowing the user ease of sighting the cut line to cut on the work piece.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A circular saw, comprising:
   a motor;
   a blade drivingly attached to said motor; and
   an upper blade guard in partial covering relationship over said blade and including a perimeter outer surface disposed between first and second side surfaces, said upper blade guard including a first sight window in said first side surface, a second sight window in said second side surface and a light window in said perimeter outer surface.

2. The circular saw according to claim 1, further comprising a plastic sight window unit including said first and second sight windows and said light window integrally formed as a unitary member, said first sight window being disposed in a first sight window opening, said second sight window being disposed in a second sight window opening and said light window being disposed in a light window opening.

3. The circular saw according to claim 2, wherein said plastic sight window unit is secured between said first and second side surfaces of said upper blade guard by a fastener.

4. The circular saw according to claim 1, wherein said first sight window is disposed in an opening surrounded by a frame portion which is angularly disposed relative to said first side surface.

5. The circular saw according to claim 4, wherein said frame portion projects outwardly from said first side surface.

6. A circular saw, comprising:
   a motor;
   a blade drivingly attached to said motor; and
   an upper blade guard in partial covering relationship over said blade and including a perimeter outer surface disposed between first and second side surfaces, said upper blade guard including a first sight window disposed in said first side surface, said first sight window being disposed in a plane angularly offset at an angle of between 20 and 60 degrees from a plane of said blade.

7. The circular saw according to claim 1, further comprising a light window disposed in a front portion of said perimeter outer surface.

8. The circular saw according to claim 1, wherein said first side surface of said upper blade guard includes an angularly disposed window frame portion projecting from a planar surface thereof, said first sight window being disposed in said angularly disposed window frame portion.

9. A circular saw, comprising:
   a motor;
   a blade drivingly attached to said motor; and
   an upper blade guard in partial covering relationship over said blade and including a perimeter outer surface disposed between first and second side surfaces, said upper blade guard including a first sight window disposed in said first side surface, said first sight window being disposed in a plane angularly offset from a plane of said blade; and
   a second sight window disposed in said second side surface of said upper blade guard.

10. The circular saw according to claim 9, further comprising a light window disposed in a front portion of said perimeter outer surface.

11. The circular saw according to claim 10, wherein said upper blade guard is made from metal and said first and second sight windows and said light window are integrally formed as a one-piece member.

12. The circular saw according to claim 10, wherein said upper blade guard includes a first portion attached to a housing of said motor and a second portion attached to said first portion, said first and second sight windows and said light window are integrally formed as a sight window unit and are disposed between said first and second portions of said upper blade guard.

13. The circular saw according to claim 12, wherein said first portion and said second portion of said upper blade guard are attached to one another by a plurality of fasteners, one of said plurality of fasteners retains said sight window unit in place.

14. A circular saw, comprising:

a motor;

a blade drivingly attached to said motor; and an upper blade guard in partial covering relationship over said blade and including a perimeter outer surface disposed between first and second side surfaces, said upper blade guard including a first sight window disposed in said first side surface, said first sight window being disposed in a plane angularly offset from a plane of said blade, and including a light window disposed along a front edge of said perimeter outer surface.

* * * * *